(12) United States Patent
Falcon (10) Patent No.: US 6,593,955 B1
(45) Date of Patent: Jul. 15, 2003

(54) VIDEO TELEPHONY SYSTEM

(75) Inventor: Stephen R. Falcon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/084,527

(22) Filed: May 26, 1998

(51) Int. Cl.[7] ................................................. H04N 7/14
(52) U.S. Cl. ............................... 348/14.01; 348/14.08; 348/14.16
(58) Field of Search .............................. 348/14, 15, 16, 348/17, 208, 409, 586; H04N 7/14

(56) References Cited

U.S. PATENT DOCUMENTS 5,572,248 A  * 11/1996 Allen et al. ................... 348/15

FOREIGN PATENT DOCUMENTS

| JP | 402039690 A | * | 8/1990 | ............ H04N/7/14 |
| JP | 405068241 A | * | 3/1993 | ............ H04N/7/14 |
| JP | 406319130 A | * | 11/1994 | ............ H04N/7/13 |
| JP | 407250272 A | * | 9/1995 | ........... H04N/5/232 |

* cited by examiner

*Primary Examiner*—Melur Ramakrishnaiah
(74) *Attorney, Agent, or Firm*—Workman, Nydegger & Seeley (57) ABSTRACT

A process, software and apparatus for eliminating from a video telephony signal information that is extraneous to the user's head, and replacing it with a monotonous data for transmission to the other end of the videophone link, is disclosed. The resulting video stream looks better upon subsequent viewing, and can be more efficiently transmitted and/or compressed for transmission or recording. Furthermore, the system provides for background setting replacement in video telephony encoding and decoding, wherein an image stored on the receiving end of the videophone link can be used to replace the monotonous data. Furthermore, the system provides for a sliding viewport that allows a user to position or adjust the source camera to provide a wide field of view, but ensures that the user's head will be automatically centered within the transmitted video signal. Thus, the user's need to adjust the position of his head or the camera, in order to ensure that the proper image is being transmitted or recorded, is reduced. Furthermore, the process also reduces lateral movement of the users head in the transmitted image, thereby providing more efficient transmission and/or compression of video data, as well as a better looking image upon later viewing.

77 Claims, 5 Drawing Sheets

VIDEO TELEPHONY SYSTEM

TECHNICAL FIELD OF THE INVENTION

This invention relates generally to video telephony, and more particularly to method, apparatus and software for video image processing and display.

BACKGROUND OF THE INVENTION

A video telephony application typically involves a pair of subjects for which images of their busts are captured and transmitted to each other, along with audio of their voices, in order for both to carry on a conversation as if they were actually face to face. Video telephony applications are many, and include business, academic, and personal communications.

With the advent of pervasive digital communications infrastructure, and less expensive imaging and image processing systems, video telephony is possible in a variety of settings, including office desktops, home telephone sites, phone booths, and other places. However, in most settings for which video telephony is desired, the physical environment or surroundings contain visible features that will appear behind the head of a subject whose likeness is being transmitted. These visible features will often degrade the video telephony experience in a number of ways.

For instance, these features are usually not material to the communication underway, and therefore are visually distracting. Also, they constitute spatial information, and therefore add work to image processing and compression systems involved in transmission or recording. When the subjects head moves, any visible features of the environment behind the subject's head are obscured and/or revealed, which constitutes temporal and spatial information that add work to image processing and compression systems involved in transmission or recording.

Moreover, video telephone systems must be convenient and pleasing to use if they are to attain their full potential. Video acquisition, however, can be inconvenient and unduly restrictive, in that the videophone user must either physically position his head approximately within a video camera's field of view, or point the video camera precisely in order to place its field of view around the user's head. In most of these settings, a subject is required to physically move his head or the camera itself in order to ensure that the transmitted image contains a visually well-framed likeness of himself. However, this manual process is burdensome and prone to error, as people often move both intentionally and unintentionally, resulting in the need to either correct one's position or the position of the camera. Video telephony is especially prone to this problem, as a subject is likely to pay more attention to the image of the person he is talking to than the visual suitability of the image in the "self-view" feedback display.

Additionally, the quality of a video image in a videophone system is largely a function of the quantity of video data that can be transmitted per unit time from one videophone to another. Therefore, the success and popularity of video telephone technology is largely dependent on the ability to compress, transport and decompress image data quickly and efficiently.

SUMMARY OF THE INVENTION

According to one aspect of the invention, there is provide a method of processing video input data originating from a camera in a videophone system. An initial step of the process acquires a frame of the video input data, wherein the frame of input data includes data depicting the head of a user of the videophone system, and data depicting a background setting. The background setting data is eliminated from the frame of video input data to produce a frame of video data without the background setting data. The method further includes the step of transmitting data representing the frame of video data without the background setting data to a remote end of a video telephone link.

According to another aspect of the invention, the background setting data is replaced with monotonous data. Furthermore, the monotonous data may be encoded with a transparency value.

According to yet another aspect, the method further includes the step of receiving the transmitted frame of data at the remote end of the link and displaying the data depicting the user's head with a replacement image substituted for the eliminated background setting. Furthermore, according to an additional aspect, the replacement image is stored at the remote end of the link. Moreover, according to another aspect, a frame for display at the remote end is formed as a product of the transmitted data and the replacement image for the background setting.

According to still another aspect of the invention, a frame of the video input data is acquired, wherein the frame of input data includes data depicting the head of a user of the videophone system. A viewport framing all or a substantial portion of the user's head is identified within the acquired frame, wherein the viewport defines a subset of the acquired frame, and the user's head is centered substantially within the center of the viewport. The method further comprises transmitting data representing all or a portion of the image within the viewport to a remote end of the videophone link.

According to still other aspects of the invention, the acquired frame of video input data includes data depicting a background setting, and the method includes the step of eliminating the background setting data from the data in the viewport region of the acquired frame.

Furthermore, according to another aspect of the invention, the background setting data is replaced with monotonous data prior to the step of transmitting all or a portion of the data within the viewport. On the remote end, a replacement image is substituted for the background setting eliminated from the frame.

These and other aspects of the invention, including implementation in hardware and software, are described in more detail herein below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
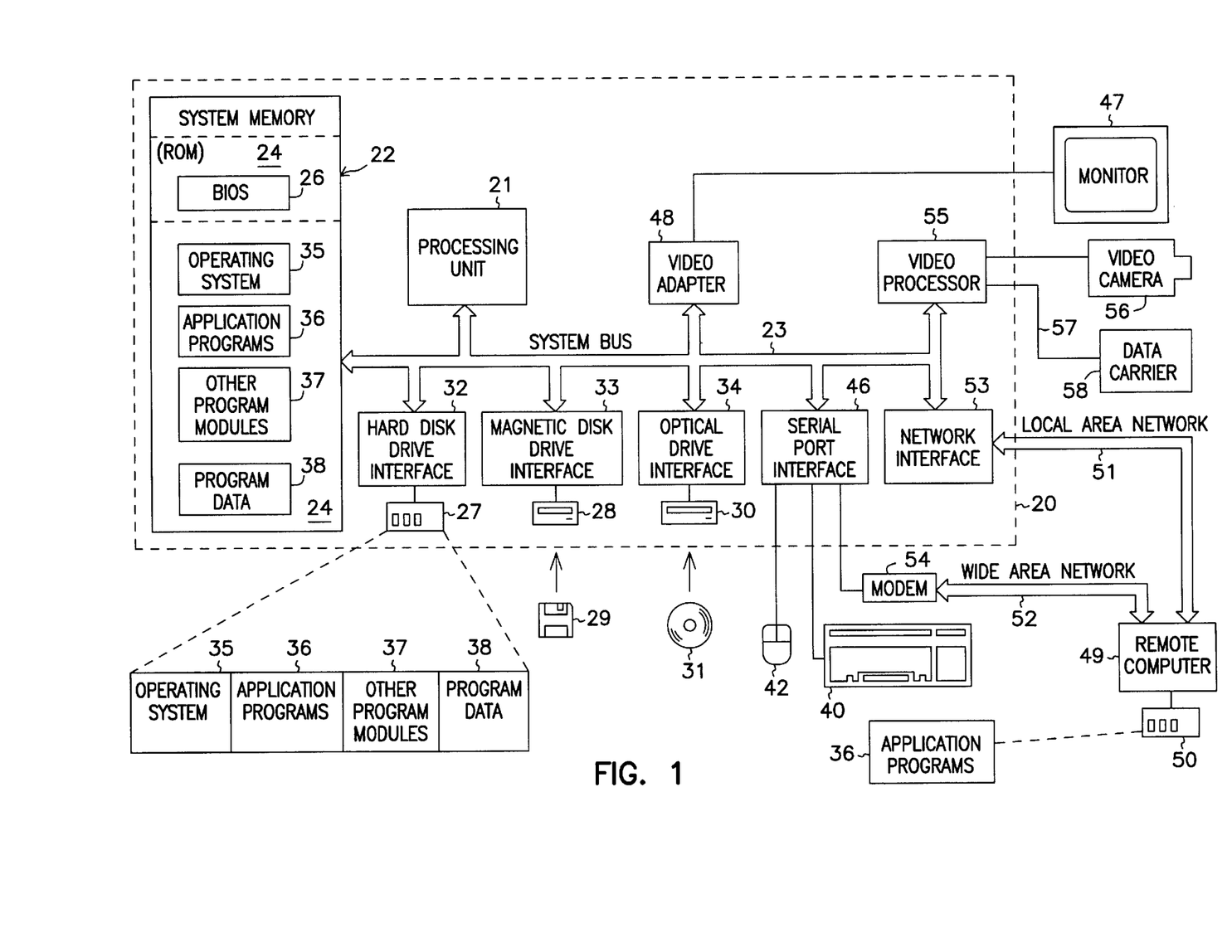
FIG. 1 is a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types. The invention may also be implemented in whole or in part using special purpose discrete logic, such as a programmable array logic device.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, configured with a video processor 55, connected to the system bus 23, and camera 56, to provide videophone functionality. Video processor 55 includes programmable and discrete logic for acquiring a frame of video data, for high speed encoding and decoding of a video data stream, such as but not by way of limitation, a VIDEO STANDARD HERE compatible video data stream, or equivalent or alternate therefor, and for outputting a video image for display. Video processor 55 also includes an input-output (I/O) port 57 connected to a data carrier 58, such as but not way of limitation an analog POTS line, or a digital ISDN or T1, or international equivalent, telephone line.

Computer 20 further includes a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Video Image Processing

Figure 2:
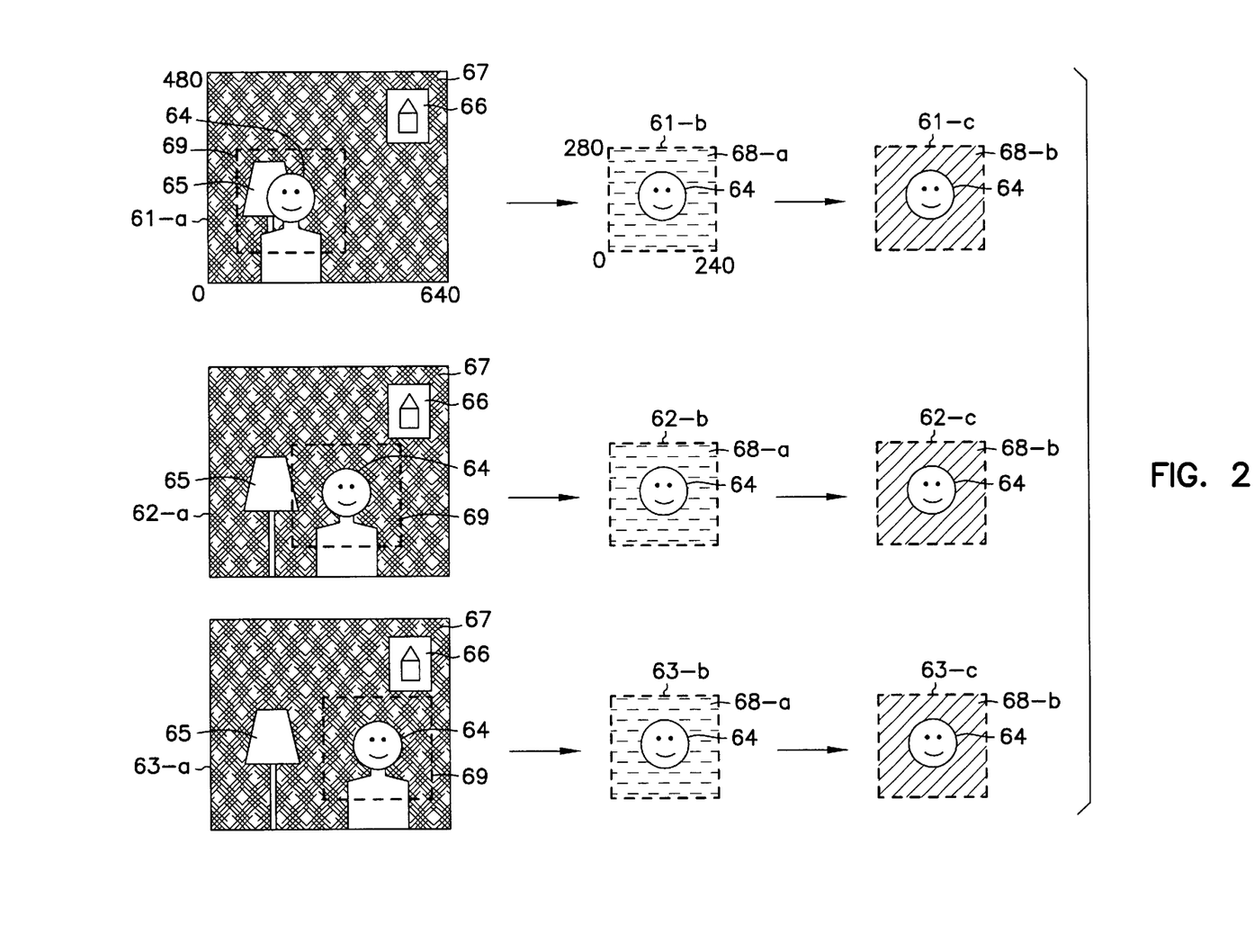
FIG. 2 illustrates the processing of video images in a videophone system according to the present invention.

Referring now to FIG. 2, there is illustrated the processing of video images in a videophone system according to one example embodiment of the present invention. A plurality of input images 61-a, 62-a and 63-a, illustrate successive frames of a source video signal acquired from a video camera on a first end (alternately referred to herein as the "transmitting" end) of a videophone link. Each video image 61-a, 62-a and 63-a, includes, for example, 640H×480W pixels. Images 61-a, 62-a and 63-a depict the head or bust of a subject 64, in the foreground of the image. The background setting of the image is formed by the subject's surroundings. In an office setting, these surroundings may include, for example, a lamp 65, and a picture 66 hung on a wall 67, which may include a patterned wall treatment. The head or bust of the subject 64 is shown moving from one side of the image to the other, in the respective successive frames.

Images 61-b, 62-b and 63-b illustrate the successive frames of an intermediate video signal derived from respective images 61-a, 62-a and 63-a of the first video signal, using the process of one example embodiment of the invention. Each of frames 61-b, 62-b and 63-b are obtained from a moving window or viewport 69 in each of frames 61-a, 62-a and 63-a. Each viewport 69 includes a subset of the pixels in their respective source frames 61-a, 62-a and 63-a, for example, 240×280 pixels, sufficient to depict the head or bust of the subject 64. Centered within each frame 61-b, 62-b and 63-b is the head or bust of the subject 64, with the background of images 61-a, 62-a and 63-a removed, and a monotonous image substituted in its place. Thus, the intermediate video signal contains the information of interest, that is, the head or bust of the subject 64, with a monotonous background 68-a, which may take the form of a solid black or other color. This signal advantageously maintains the subject's head centered in each frame, removes unwanted or undesirable information from the background image of the source signal, and is more efficient to encode (for example using a video signal compression algorithm) and transmit to the other end of the video link, than the source signal. According to one optional embodiment of the invention, the monotonous background image is coded with a zero opaqueness value.

Images 61-c, 62-c and 63-c illustrate the successive frames of an output video signal derived from the decoded intermediate video signal, for display on the other end (alternately referred to herein as the "receiving" end) of the videophone link, according to an example embodiment of the invention. In images 61-c, 62-c and 63-c, the head or bust of the subject 64 is superimposed on a background image 68-b stored on the receiving end of the link, by combining the intermediate video signal with the stored background image, as explained in more detail below. The result is a video output signal with the information of interest, that is, the head or bust of the subject 64, with a pleasant or otherwise desirable background signal 68-b. Because intermediate images 61-b, 62-b and 63-b are encoded with a monotonous background image, the output video signal can be efficiently decompressed and processed to produce the output signal, using well known conventional video processing methods.

Thus, as described in more detail below, the invention employs a background elimination process that replaces the image data representing visible information behind the subject's head or bust with monotonous data. Such replacement eliminates unnecessary and displeasing information, and eliminates unnecessary load on downstream image compression, transmission and decompression systems.

Furthermore, the process reduces the user's need to adjust the position of his head or the camera, in order to ensure that the proper image is being transmitted or recorded. The process also reduces lateral movement of the user's head in the transmitted image, thereby providing more efficient transmission and/or compression of video data, as well as a better looking image upon later viewing.

Figure 3:
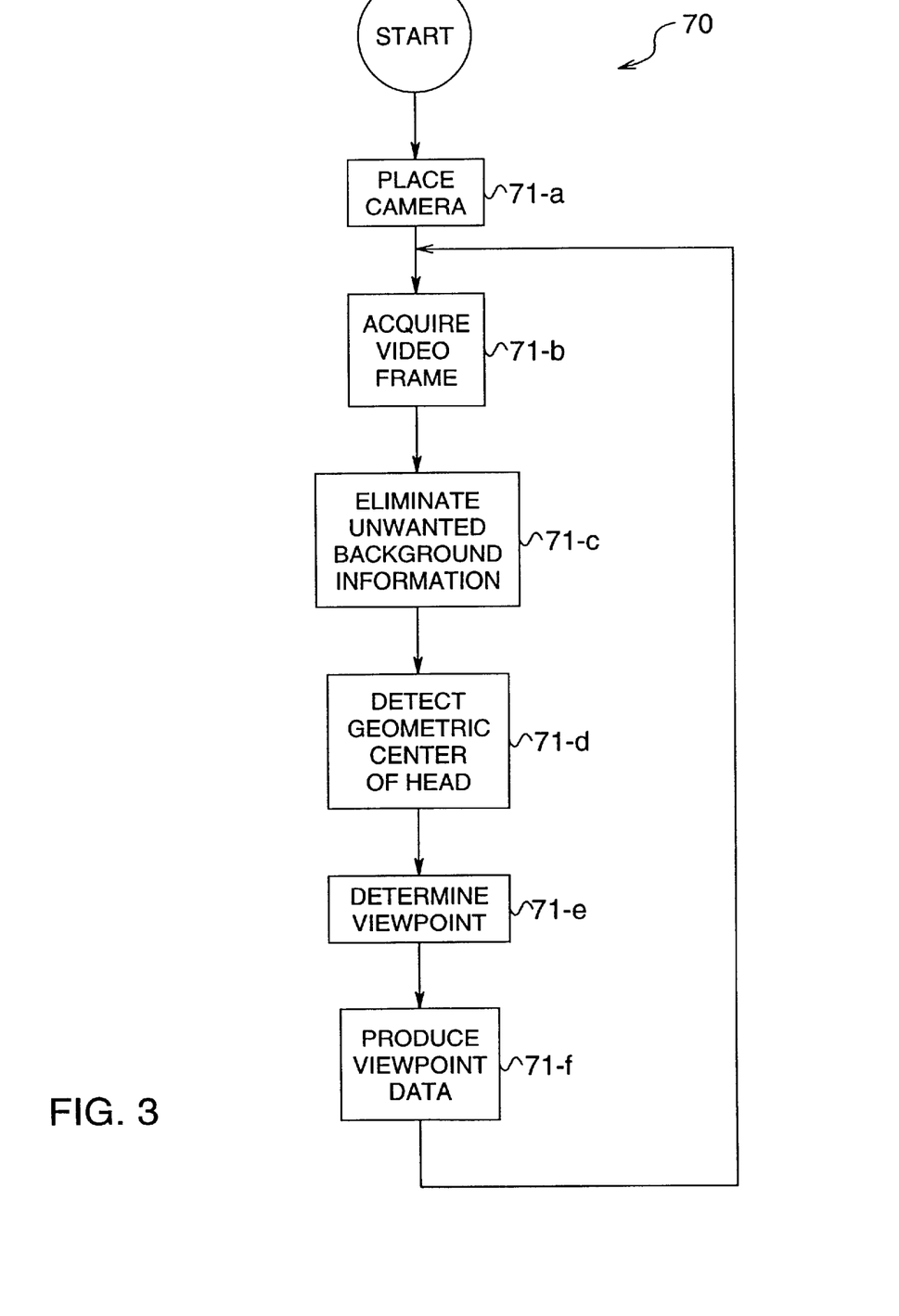
FIG. 3 illustrates an example embodiment of a method for processing video images for transmission in a videophone system according to the present invention.

Referring now to FIG. 3, there is illustrated a simplified block diagram of the process 70 outlined above with respect to FIG. 2. Process 70 is a single process that both reduces the user's need to adjust his or the camera's position, and reduces motion data in the video stream, thereby reducing the load on downstream compression and/or transmission or recording systems. Process 70 begins with step 71-a, providing that the source camera is placed and/or adjusted so that the area of the imaged subject's head or bust occupies less of the overall field of camera view than would be typical of a normal configuration. For example, the width of a subject's head should appear to occupy one-sixth (⅙) of the width of the field of view, rather than a more typical approximately one-third (⅓). An example of this type of ratio is illustrated in images 61-a, 62-a and 63-a of FIG. 2.

Next, a frame of video is acquired (71-b), and processed as follows:

1) The extraneous visual information is eliminated from the background image behind the subject's head or bust, using a background elimination process (71-c).
2) The geometric center of the image of the subject's head is detected using any one of known face detection algorithms, or other suitable algorithms (71-d)
3) A rectangular region, identified above as viewport 69 in FIG. 2, that is centered on the subject's head, is then determined (71-e).
4) The image data within the viewport is produced as the output video frame for encoding by a video processing device (71-f).
5) The frame of data may be thereafter processed, such as being compressed pursuant to any one of several video/encoding compression algorithms, and data representing the image in the frame is transmitted to the other end of a videophone link (71-g).

The size of the viewport is not critical, but preferably is sized, either dynamically or statically, to frame a user's face, or optionally the user's bust. For example, if the video frame produced by the video capture process has the dimensions 640W×480H pixels, a constant viewport size of 240W× 280H may be desirable pixels, such as illustrated in FIG. 2. In this example, if the center of subject's head is at 300,200 (x, y) within the 640W×480H frame, then:

viewport_origin$_x$=300−0.5*240=180 viewport_origin$_y$=200−0.5*280=60

The resulting video stream, or signal, comprises successive viewports whose origins in their respective original frames will vary with the movement of the subject, so that the subject's head is always centered, regardless of the movement of the subject within the field of view of the source camera. Since the viewport is calculated uniquely for each frame of original video, and since both the image of the subject's head and the viewport are both significantly smaller than the original frame of video, the viewport "follows" the subject's head as it moves. Within the bounds of camera's increased field of view, this "sliding viewport" behavior eliminates the subject's need to adjust his or the camera's position in order to ensure proper visual framing.

Moreover, this video stream contains the spatial and temporal information within the bounds of the subject's head or bust, but excludes spatial and temporal information of the background behind the subject. Consequently, the video stream is ideally suited for transmission and/or compression or recording.

Figure 4:
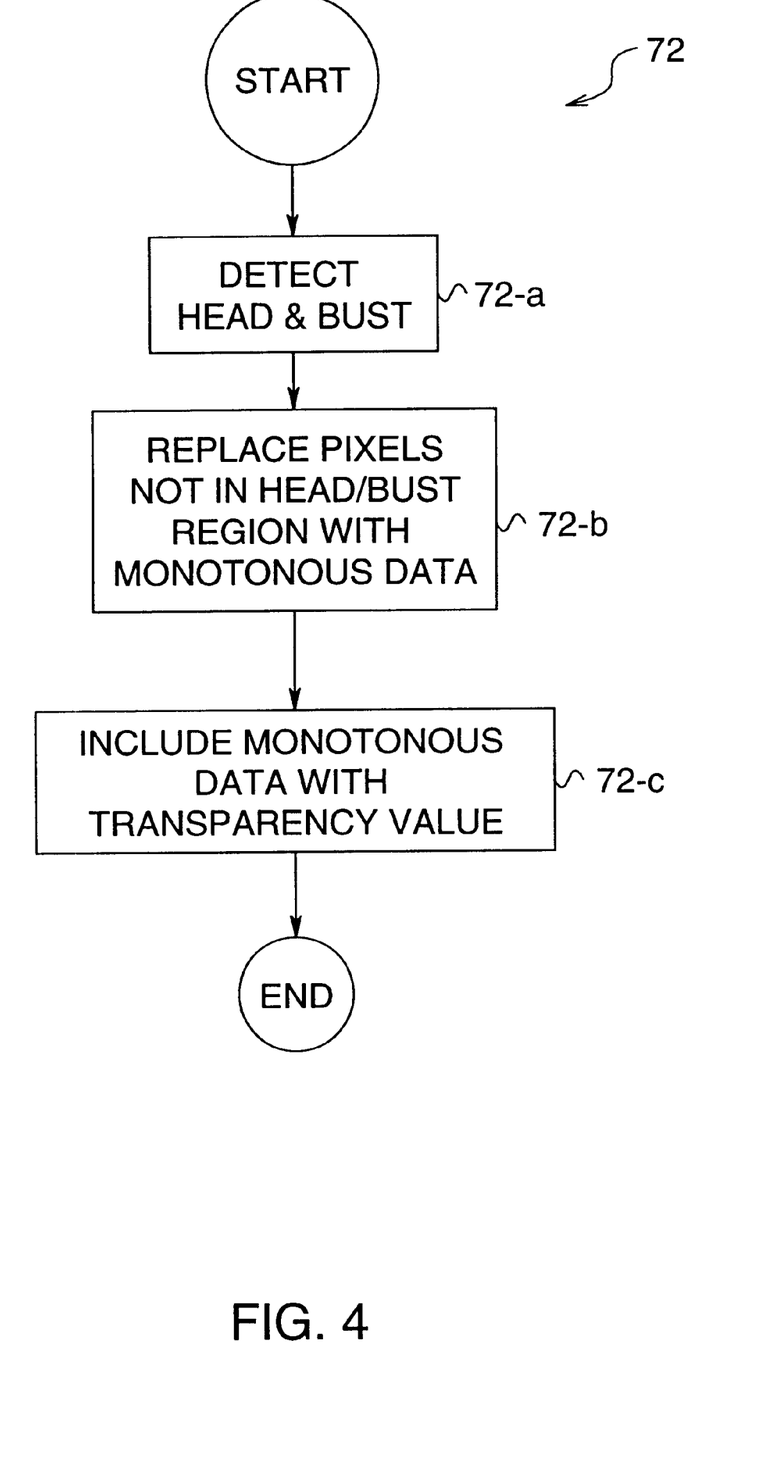
FIG. 4 illustrates a further aspect of the example embodiment of FIG. 3 according to the present invention.

Referring to FIG. 4, there is illustrated the process 72 for background elimination according to one example embodiment of the invention. Process 72 is implemented in two steps for each frame of video data, as follows:

1) The irregular, and possibly discontinuous area within the frame that contains the subject's head or bust is detected (72-a), using, for example, known face detection algorithms.
2) Each point in the frame, if it is not within the head area, is replaced with a constant value that will be used for all background replacement (such as black or another color) (72-b).
3) Optionally, the monotonous data is encoded with a transparency value that represents zero opaqueness.

The resulting video stream, or signal, will contain the likeness of the subject's head or bust, but without other visible features of the person's environment, subject to the accuracy of the face detection algorithm. Moreover, the resulting video stream, when fed to the downstream video compression and/or transmission or recording process, will be more efficiently compressible that the original stream.

A solid color, such as black or blue, for the background behind a subject's head, is ideal from the standpoint of compression and transmission or recording, but is not as aesthetically pleasing as other possible background images. Thus, the invention further provides an example embodiment providing for background replacement wherein the monotonous background yielded from the above-described process is replaced with a more visually pleasing background "replacement image", such as a gradient fill or another more typical of portraiture. As noted above, on example embodiment of the process of the invention optionally provides, during the encoding process, coding the monotonous data with an alpha (transparency) value that represents zero opaqueness.

Figure 5:
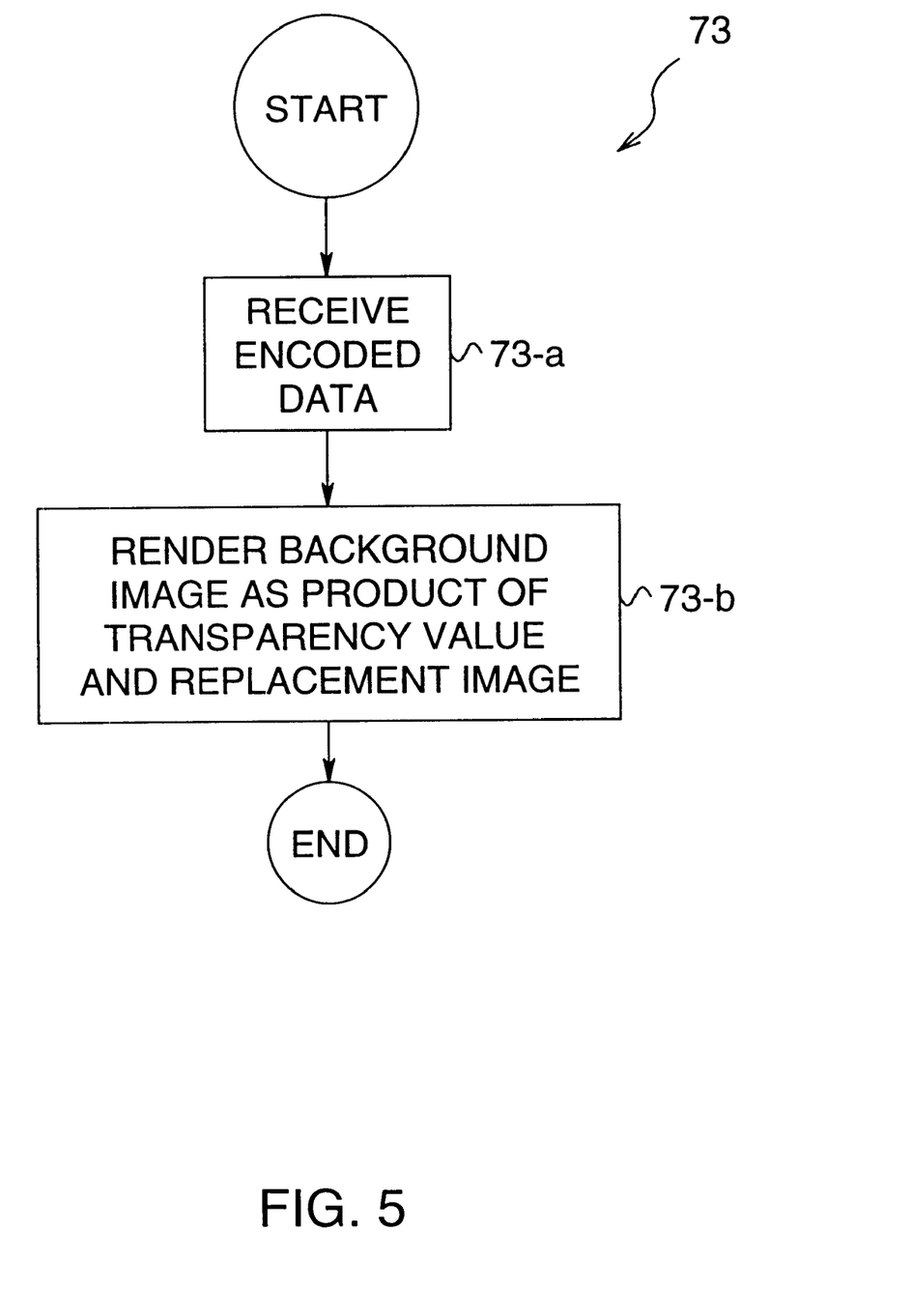
FIG. 5 illustrates the processing of incoming video data for display in a videophone system according to the present invention.

As illustrated in FIG. 5, background replacement is then accomplished on the receiving end of the videophone link, using a process 73, by first receiving the encoded data (73-a). During the decoding process, any received point that is coded with zero opaqueness is rendered (73-b) as the product of its transparency value (100%) and the value of the corresponding point in the replacement image. The replacement image resides on the decoding system.

As illustrated in FIG. 2, the resulting images (61-c, 62-c and 63-c) displayed on the decoding system are void of extraneous visual features of the encoding system's physical environment behind the subject's head, but instead includes the pleasing background replacement image.

Background replacement can be employed with any number of intermediate filtering, compression, motion elimination, or other processing steps, as long as the alpha value of eliminated background image data survives such steps.

Alternate Embodiments

The invention as described above, in its various example embodiments, may be practiced in a number of ways. For instance, the sliding viewport may be implemented with or without the elimination of unwanted background setting images, and in turn with or without replacing the monotonous background image with a substitute or replacement image, as described with respect to FIG. 5. Similarly, the elimination of unwanted background images and substitution of monotonous data therefor, may be practiced with or without the moving viewport, and with or without the process described in FIG. 5, to providing a replacement image stored on the receiving end of the link.

Furthermore, it is contemplated that many different methods or processes may be used to identify the user's face or bust, identify the viewport of interest, and provide for the substitution of monotonous data for unwanted background setting images, and for replacement images on the receiving end. Thus, the particular embodiments herein described should be understood to be illustrative and not limiting.

It is also noted that the order in which the steps of the process 70 and 72 are performed may be altered and still attain the advantageous features of the invention. For instance, in process 70, the viewport may be determined first, and the unwanted background information in the background setting eliminated from the data in the viewport region of the image.

Implementation

The various embodiments of the invention herein described may be implemented on a variety of different software and/or hardware platforms. For example, as described with respect to FIG. 1, the invention may be implemented as part of a general purpose personal computer or workstation adapted with a plug-in video processor 55, which receives input from a camera 56 mounted on or near the workstation. While the processor 55 is illustrated as providing a port 58 to a carrier, such as a telephone connection, the processor 55 may alternately input and output video signals over the local area network 51 or wide area network 52. Furthermore, the invention in its various embodiments may be implemented in any combination of hardware and/or software, and it is expressly contemplated that much of the encoding and decoding of the video signal to compress and decompress, for example, will be carried out with special purpose, high speed, silicon devices. However, it is also contemplated that such processing may be done in software with appropriate algorithms or CPU's of adequate speed. It is also contemplated that the invention will be implemented in special purpose, dedicated videophone/video teleconferencing equipment.

Furthermore, it shall be understood that the terms "videophone" and "video teleconferencing", as used herein, are interchangeable, with each referring to a system for capturing images and audio from users on each end of a connection, or link, and transmitting the audio signal substantially simultaneously from end to end, so as to allow for a conversation between users on each end of the link, and so as to provide an accompanying video signal which is updated at a rate sufficient to convey the sense of a live image of each user to the user on the other end of the link.

It is also noted that the invention is particularly well suited for application to videophone systems that are designed for use by a user of a personal computer or workstation, or other network terminal, with a manually adjusted camera typically mounted on the video display of the computer. In addition, as used herein, the term "frame" is not meant to be restrictive, but rather to mean any collection of video data corresponding to a part of or one or more successive images of a video signal, or stream.

Conclusion

Thus, as described above, the invention provides for eliminating from a video telephony signal information that is extraneous to the user's head, and replacing it with a monotonous data for transmission to the other end of the videophone link. The resulting video stream looks better upon subsequent viewing, and can be more efficiently transmitted and/or compressed for transmission or recording. Furthermore, the invention provides for background setting replacement in video telephony encoding and decoding, wherein an image stored on the receiving end of the videophone link can be used to replace the monotonous data.

Furthermore, the invention provides for a sliding viewport that allows a user to position or adjust the source camera to provide a wide field of view, but ensures that the user's head will be automatically centered within the transmitted video signal. Thus, the user's need to adjust the position of his head or the camera, in order to ensure that the proper image is being transmitted or recorded, is reduced. Furthermore, the process also reduces lateral movement of the users head in the transmitted image, thereby providing more efficient transmission and/or compression of video data, as well as a better looking image upon later viewing.

What is claimed is:

1. A method of processing video input data originating from a camera in a videophone system so as to reduce the amount of data transmitted during a video teleconference, the method comprising acts of:
   receiving a plurality of frames of video input data, wherein each received frame includes data depicting a user of a videophone system and fixed background data common to each received frame;
   substituting monotonous data for at least a portion of the fixed background data of each received frame, which simplifies data compression for each received frame because data compression need not account for any variations in the monotonous data;
   calculating the geometric center of the user's head within each received frame, wherein each calculation is based on a face detection algorithm; and
   defining a sliding viewport substantially centered about the calculated geometric center of the user's head to reduce the need to process data representing movement of the user from one received frame to another.

2. A method as recited in claim 1, further comprising an act of transmitting video data within the viewport to a remote end of the video teleconference.

3. A method as recited in claim 2, further comprising an act of substituting a replacement image for the monotonous data at the remote end of the video teleconference.

4. A method as recited in claim 3, further comprising an act of storing the replacement image at the remote end of the video teleconference.

5. A method as recited in claim 1, wherein the monotonous data is a single color.

6. A method as recited in claim 1, wherein the monotonous data has zero opaqueness.

7. A method as recited in claim 1, wherein the viewport has a rectangular shape.

8. In videophone system that processes video input data originating from a camera, a computer program product for implementing a method of reducing the amount of data transmitted during a video teleconference, the computer program product comprising:
   a computer readable medium carrying machine-executable instructions for implementing the method; and
   wherein said method is comprised of machine-executable instructions for performing acts of:
      receiving a plurality of frames of video input data, wherein each received frame includes data depicting a user of a videophone system and fixed background data common to each received frame;
      substituting monotonous data for at least a portion of the fixed background data of each received frame, which simplifies data compression for each received frame because data compression need not account for any variations in the monotonous data;
      calculating the geometric center of the user's head within each received frame, wherein each calculation is based on a face detection algorithm; and
      defining a sliding viewport substantially centered about the calculated geometric center of the user's head to reduce the need to process data representing movement of the user from one received frame to another.

9. A computer program product as recited in claim 8, wherein the method further comprises an act of transmitting video data within the viewport to a remote end of the video teleconference.

10. A computer program product as recited in claim 8, wherein the monotonous data is a single color.

11. A computer program product as recited in claim 8, wherein the monotonous data has zero opaqueness.

12. A computer program product as recited in claim 8, wherein the viewport has a rectangular shape.

13. A method of processing video input data originating from a camera in a videophone system so as to reduce the amount of data transmitted during a video teleconference, the method comprising steps for:
   acquiring a plurality of frames of video input data, wherein each acquired frame includes data depicting a user of a videophone system and fixed background data common to each acquired frame;
   altering at least a portion of the fixed background data from each acquired frame such that the background data comprises monotonous data which simplifies data compression for each acquired frame because data compression need not account for any variations in the monotonous data;
   identifying a viewport for each acquired frame that is (i) a subset of each acquired frame (ii) includes the head of the user, and (iii) defines an area surrounding the user's head and including at least a portion of the background data; and
   for each acquired frame, sliding the viewport so that is substantially centered about the user's head to substantially reduce the need to process data representing movement of the user from one acquired frame to another.

14. A method as recited in claim 13, further comprising a step for providing video data within the viewport to a remote end of the video teleconference.

15. A method as recited in claim 14, further comprising a step for replacing the monotonous data with a replacement image at the remote end of the video teleconference.

16. A method as recited in claim 13, wherein the monotonous data is a single color.

17. A method as recited in claim 13, wherein the monotonous data has zero opaqueness.

18. A method as recited in claim 13, wherein the viewport has a rectangular shape.

19. A method as recited in claim 13, wherein the step for identifying the viewport includes an act of calculating the geometric center of the user's head within each acquired frame.

20. A method as recited in claim 19, wherein each calculation is based on a face detection algorithm.

21. In a videophone system that processes video input data originating from a camera, a computer program product for implementing a method of reducing the amount of data transmitted during a video teleconference, the computer program product comprising:
   a computer readable medium carrying machine-executable instructions for implementing the method; and
   wherein said method is comprised of machine-executable instructions for performing steps for:
      acquiring a plurality of frames of video input data, wherein each acquired frame includes data depicting a user of a videophone system and fixed background data common to each acquired frame;
      altering at least a portion of the fixed background data from each acquired frame such that the background data comprises monotonous data which simplifies data compression for each acquired frame because data compression need not account for any variations in the monotonous data;
      identifying a viewport for each acquired frame that is (i) a subset of each acquired frame, (ii) includes the head of the user, and (iii) defines an area surrounding the user's head and including at least a portion of the altered background data; and
      for each acquired frame, sliding the viewport so that it is substantially centered about the user's head to substantially reduce the need to process data representing movement of the user from one acquired frame to another.

22. A computer program product as recited in claim 21, wherein the method further comprises a step for providing video data within the viewport to a remote end of the video teleconference.

23. A computer program product as recited in claim 21, wherein the monotonous data is a single color.

24. A computer program product as recited in claim 21, wherein the monotonous data has zero opaqueness.

25. A computer program product as recited in claim 21, wherein the viewport has a rectangular shape.

26. A computer program product as recited in claim 21, wherein the step for identifying the viewport includes an act of calculating the geometric center of the user's head within each acquired frame.

27. A computer program product as recited in claim 26, wherein each calculation is based on a face detection algorithm.

28. A method of processing video input data originating from a camera in a videophone system so as to reduce a user's need to (i) adjust position with respect to the camera, or (ii) adjust orientation of the camera, and to reduce the amount of data transmitted during a video teleconference, the method comprising acts of:
   receiving a plurality of frames of video input data, wherein each received frame includes data depicting a user of a videophone system and fixed background data common to each received frame;
   substituting monotonous data for at least a portion of the fixed background data of each received frame, which simplifies data compression for each received frame because data compression need not account for any variations in the monotonous data;
   calculating the geometric center of the user's head within each received frame, wherein each calculation is based on a face detection algorithm; and
   defining a sliding viewport substantially centered about the calculated geometric center of the user's head to reduce the need to process data representing movement of the user from one received frame to another.

29. A method as recited in claim 28, further comprising an act of transmitting video data within the viewport to a remote end of the video teleconference.

30. A method as recited in claim 29, further comprising an act of substituting a replacement image for the monotonous data at the remote end of the video teleconference.

31. A method as recited in claim 30, further comprising an act of storing the replacement image at the remote end of the video teleconference.

32. A method as recited in claim 28, wherein the monotonous data is a single color.

33. A method as recited in claim 28, wherein the monotonous data has zero opaqueness.

34. For a videophone system that processes video input data originating from a camera, a computer program product for implementing a method of reducing a user's need to (i) adjust position with respect to the camera, or (ii) adjust orientation of the camera, and of reducing the amount of data transmitted during a video teleconference, the computer program product comprising:
   a computer readable medium carrying machine-executable instructions for implementing the method; and
   wherein said method is comprised of machine-executable instructions for performing acts of:
      receiving a plurality of frames of video input data, wherein each received frame includes data depicting a user of a videophone system and fixed background data common to each received frame;
      substituting monotonous data for at least a portion of the fixed background data of each received frame, which simplifies data compression for each received frame because data compression need not account for any variations in the monotonous data;
      calculating the geometric center of the user's head within each received frame, wherein each calculation is based on a face detection algorithm; and
      defining a sliding viewport substantially centered about the calculated geometric center of the user's head to reduce the need to process data representing movement of the user from one received frame to another.

35. A computer program product as recited in claim 34, wherein the method further comprises an act of transmitting video data within the viewport to a remote end of the video teleconference.

36. A computer program product as recited in claim 34, wherein the monotonous data is a single color.

37. A computer program product as recited in claim 34, wherein the monotonous data has zero opaqueness.

38. A method of processing video input data originating from a camera in a videophone system so as to reduce a user's need to (i) adjust position with respect to the camera, or (ii) adjust orientation of the camera, and to reduce the amount of data transmitted during a video teleconference, the method comprising steps for:

acquiring a plurality of frames of video input data, wherein each acquired frame includes data depicting a user of a videophone system and fixed background data common to each acquired frame;

altering at least a portion of the fixed background data from each acquired frame such that the background data comprises monotonous data which simplifies data compression for each acquired frame because data compression need not account for any variations in the monotonous data;

identifying a viewport for each acquired frame that is (i) a subset of each acquired frame, (ii) includes the head of the user, and (iii) defines an area surrounding the user's head and including at least a portion of the altered background data; and for each acquired frame, sliding the viewport so that it is substantially centered about the user's head to substantially reduce the need to process data representing movement of the user from one acquired frame to another.

39. A method as recited in claim 38, further comprising a step for providing video data within the viewport to a remote end of the video teleconference.

40. A method as recited in claim 39, further comprising a step for replacing the monotonous data with a replacement image at the remote end of the video teleconference.

41. A method as recited in claim 38, wherein the monotonous data is a single color.

42. A method as recited in claim 38, wherein the monotonous data has zero opaqueness.

43. A method as recited in claim 38, wherein the step for identifying the viewport includes an act of calculating the geometric center of the user's head within each acquired frame.

44. A method as recited in claim 43, wherein each calculation is based on a face detection algorithm.

45. For a videophone system that processes video input data originating from a camera, a computer program product for implementing a method of reducing a user's need to (i) adjust position with respect to the camera, or (ii) adjust orientation of the camera, and of reducing the amount of data transmitted during a video teleconference, the computer program product comprising:

a computer readable medium carrying machine-executable instructions for implementing the method; and wherein said method is comprised of machine-executable instructions for performing steps for:

acquiring a plurality of frames of video input data, wherein each acquired frame includes data depicting a user of a videophone system and fixed background data common to each acquired frame;

altering at least a portion of the fixed background data from each acquired frame such that the background data comprises monotonous data which simplifies data compression for each acquired frame because data compression need not account or any variations in the monotonous data;

identifying a viewport for each acquired frame that is (i) a subset of each acquired frame, (ii) includes the head of the user, and (iii) defines an area surrounding the user's head and including at least a portion of the altered background data; and for each acquired frame, sliding the viewport so that it is substantially centered about the user's head to substantially reduce the need to process data representing movement of the user from one acquired frame to another.

46. A computer program product as recited in claim 45, wherein the method further comprises a step for providing video data within the viewport to a remote end of the video teleconference.

47. A computer program product as recited in claim 45, wherein the monotonous data is a single color.

48. A computer program product as recited in claim 45, wherein the monotonous data has zero opaqueness.

49. A computer program product as recited in claim 45, wherein the step for identifying the viewport includes an act of calculating the geometric center of the user's head within each acquired frame.

50. A computer program product as recited in claim 49, wherein each calculation is based on a face detection algorithm.

51. A method of processing video input data originating from a camera in a videophone system so as to reduce a user's need to adjust position with respect to the camera or to adjust orientation of the camera during a video teleconference, the method comprising acts of:

receiving a plurality of frames of video input data, wherein each received frame includes data depicting a user of a videophone system and fixed background data common to each received frame;

calculating the geometric center of the user's head within each received frame, wherein each calculation is based on a face detection algorithm; and defining a sliding viewport substantially centered about the calculated geometric center of the user's head, thereby reducing the user's need to adjust position with respect to the camera or to adjust orientation of the camera.

52. A method as recited in claim 51, further comprising an act of substituting monotonous data for at least a portion of the fixed background data of each received frame, which simplifies data compression for each received frame because data compression need not account for any variations in the monotonous data.

53. A method as recited in claim 52, further comprising an act of transmitting video data within the viewport to a remote end of the video teleconference.

54. A method as recited in claim 53, further comprising an act of substituting a replacement image for the monotonous data at the remote end of the video teleconference.

55. A method as recited in claim 54, further comprising an act of storing the replacement image at the remote end of the video teleconference.

56. A method as recited in claim 52, wherein the monotonous data is a single color.

57. A method as recited in claim 52, wherein the monotonous data has zero opaqueness.

58. For a videophone system that processes video input data originating from a camera, a computer program product for implementing a method of reducing a user's need to adjust position with respect to the camera or to adjust orientation of the camera during a video teleconference, the computer program product comprising:

a computer readable medium carrying machine-executable instructions for implementing the method; and wherein said method is comprised of machine-executable instructions for performing acts of:

receiving a plurality of frames of video input data, wherein each received frame includes data depicting a user of a videophone system and fixed background data common to each received frame;

calculating the geometric center of the user's head within each received frame, wherein each calculation is based on a face detection algorithm; and defining a sliding viewport substantially centered about the calculated geometric center of the user's head, thereby reducing the user's need to adjust position with respect to the camera or to adjust orientation of the camera.

59. A computer program product as recited in claim 58, wherein the method further comprises an act of transmitting video data within the viewport to a remote end of the video teleconference.

60. A computer program product as recited in claim 58, wherein the method further comprises an act of substituting monotonous data for at least a portion of the fixed background data of each received frame, which simplifies data compression for each received frame because data compression need not account for any variations in the monotonous data.

61. A computer program product as recited in claim 60, wherein the monotonous data is a single color.

62. A computer program product as recited in claim 60, wherein the monotonous data has zero opaqueness.

63. A method of processing video input data originating from a camera in a videophone system so as to reduce a user's need to adjust position with respect to the camera or to adjust orientation of the camera during a video teleconference, the method comprising steps for:

acquiring a plurality of frames of video input data, wherein each acquired frame includes data depicting a user of a videophone system and fixed background data common to each acquired frame;

identifying a viewport for each acquired frame that is (i) a subset of each acquired frame, (ii) includes the head of the user, and (iii) defines an area surrounding the user's head and including at least a portion of the altered background data; and for each acquired frame, sliding the viewport so that it is substantially centered about the user's head, thereby reducing the user's need to adjust position with respect to the camera or to adjust orientation of the camera.

64. A method as recited in claim 63, further comprising a step for altering at least a portion of the fixed background data from each acquired frame such that the background data comprises monotonous data which simplifies data compression for each acquired frame because data compression need not account for any variations in the monotonous data.

65. A method as recited in claim 64, further comprising a step for providing video data within the viewport to a remote end of the video teleconference.

66. A method as recited in claim 65, further comprising a step for replacing the monotonous data with a replacement image at the remote end of the video teleconference.

67. A method as recited in claim 64, wherein the monotonous data is a single color.

68. A method as recited in claim 64, wherein the monotonous data has zero opaqueness.

69. A method as recited in claim 63, wherein the step for identifying the viewport includes an act of calculating the geometric center of the user's head within each acquired frame.

70. A method as recited in claim 69, wherein each calculation is based on a face detection algorithm.

71. For a videophone system that processes video input data originating from a camera, a computer program product for implementing a method of reducing a user's need to adjust position with respect to the camera or to adjust orientation of the camera during a video teleconference, the computer program product comprising:

a computer readable medium carrying machine-executable instructions for implementing the method; and wherein said method is comprised of machine-executable instructions for performing steps for:

acquiring a plurality of frames of video input data, wherein each acquired frame includes data depicting a user of a videophone system and fixed background data common to each acquired frame;

identifying a viewport for each acquired frame that is (i) a subset of each acquired frame, (ii) includes the head of the user, and (iii) defines an area surrounding the user's head and including at least a portion of the altered background data; and for each acquired frame, sliding the viewport that it is substantially centered about the user's head, thereby reducing the user's need to adjust position with respect to the camera or to adjust orientation of the camera.

72. A computer program product as recited in claim 71, wherein the method further comprises a step for altering at least a portion of the fixed background data from each acquired frame such that the background data comprises monotonous data which simplifies data compression for each acquired frame because data compression need not account for any variations in the monotonous data.

73. A computer program product as recited in claim 72, wherein the method further comprises a step for providing video data within the viewport to a remote end of the video teleconference.

74. A computer program product as recited in claim 72, wherein the monotonous data is a single color.

75. A computer program product as recited in claim 72, wherein the monotonous data has zero opaqueness.

76. A computer program product as recited in claim 72, wherein the step for identifying the viewport includes an act of calculating the geometric center of the user's head within each acquired frame.

77. A computer program product as recited in claim 76, wherein each calculation is based on a face detection algorithm.

\* \* \* \* \*

UNITED STATES PATENT AND TRADEMARK OFFICE
CERTIFICATE OF CORRECTION

PATENT NO. : 6,593,955 B1
DATED : July 15, 2003
INVENTOR(S) : Stephen R. Falcon

It is certified that error appears in the above-identified patent and that said Letters Patent is hereby corrected as shown below:

Column 1,
Line 66, after "there is " please delete "provide" and insert -- provided --

Column 7,
Line 43, after "compressible" please delete "that" and insert -- than --
Line 53, after "note above," please delete "on" and insert -- an --

Column 13,
Line 66, after "not account" please delete "or" and insert -- for --

Signed and Sealed this

Tenth Day of August, 2004

JON W. DUDAS
*Acting Director of the United States Patent and Trademark Office*